(12) United States Patent
Inoue

(10) Patent No.: US 8,171,446 B2
(45) Date of Patent: May 1, 2012

(54) METHOD FOR DESIGNING A SEMICONDUCTOR DEVICE BY COMPUTING A NUMBER OF VIAS, PROGRAM THEREFOR, AND SEMICONDUCTOR DEVICE

(75) Inventor: Yoshio Inoue, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 358 days.

(21) Appl. No.: 12/511,416

(22) Filed: Jul. 29, 2009

(65) Prior Publication Data
US 2010/0025859 A1   Feb. 4, 2010

(30) Foreign Application Priority Data
Aug. 1, 2008   (JP) ................................. 2008-199925

(51) Int. Cl.
*G06F 17/50* (2006.01)
(52) U.S. Cl. ........................................ 716/127; 716/120

(58) Field of Classification Search .................. 716/109, 716/120, 122, 127, 136
See application file for complete search history.

(56) References Cited

U.S. PATENT DOCUMENTS

| 6,657,910 B2 * | 12/2003 | Kondou ........................ 365/226 |
| 7,768,768 B2 * | 8/2010 | Sakurabayashi ........... 361/306.1 |
| 2006/0151810 A1 | 7/2006 | Ohshige |

FOREIGN PATENT DOCUMENTS

JP   2006-196627 A   7/2007

\* cited by examiner

*Primary Examiner* — Vuthe Siek
(74) *Attorney, Agent, or Firm* — Fujitsu Patent Center

(57) ABSTRACT

A method for designing a semiconductor device includes computing a contact resistance value based on an allowable power supply voltage drop set for a second position corresponding to a given region of a second power supply line on a second wiring layer different from a first wiring layer, and computing a number of vias for the given region based on a result of a comparison between a resistance value of a via coupling a first power supply line and the second power supply line and the contact resistance value.

17 Claims, 16 Drawing Sheets

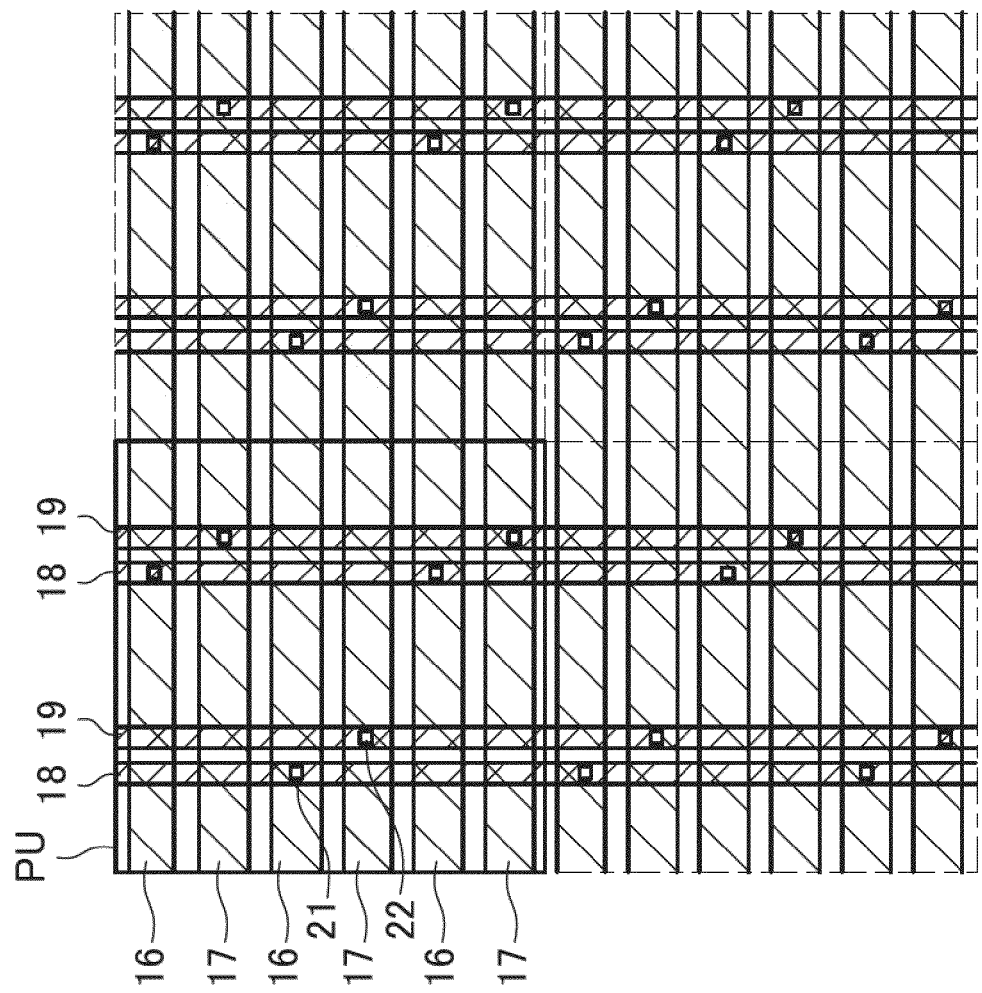

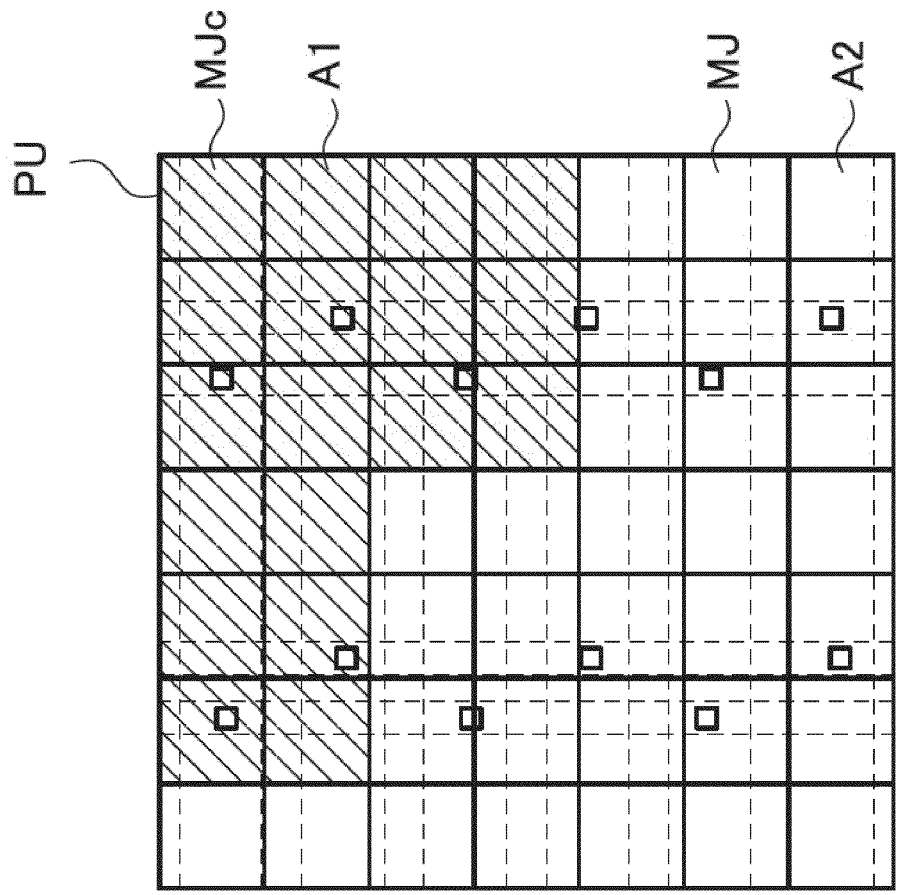

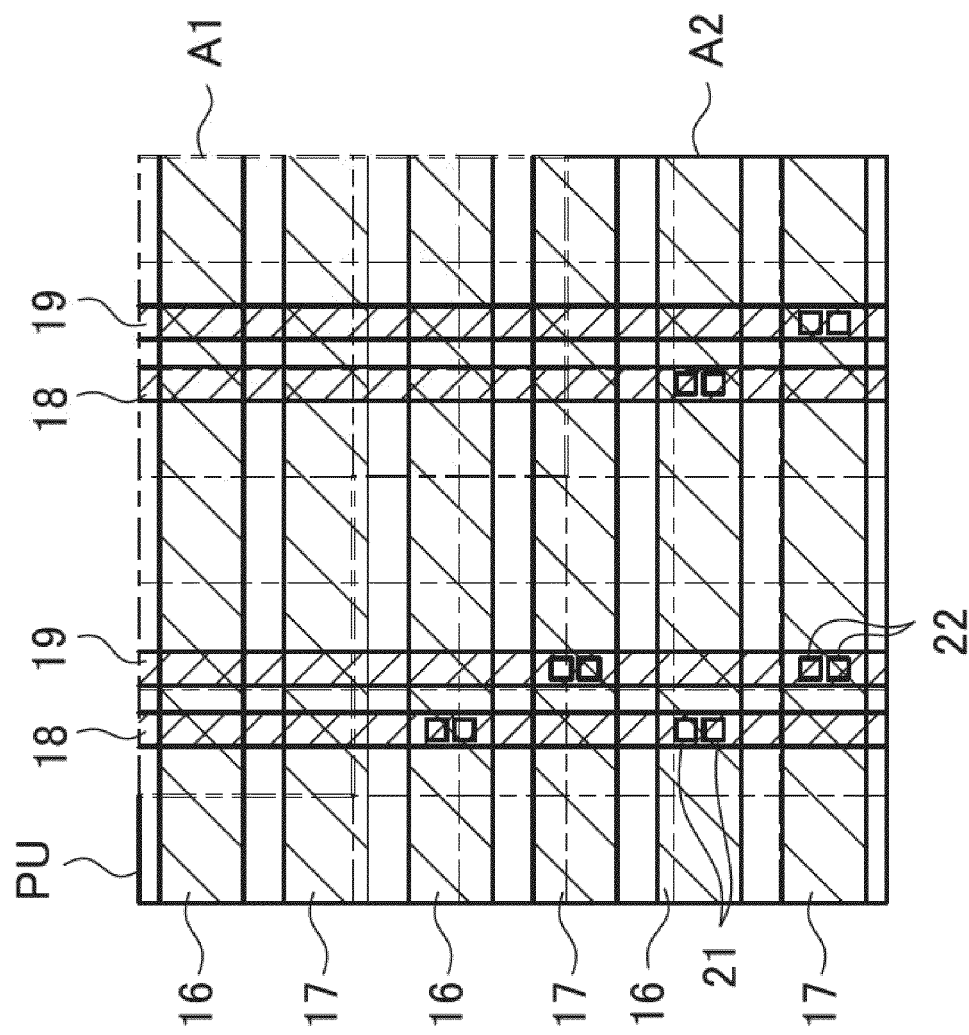

METHOD FOR DESIGNING A SEMICONDUCTOR DEVICE BY COMPUTING A NUMBER OF VIAS, PROGRAM THEREFOR, AND SEMICONDUCTOR DEVICE

CROSS-REFERENCE TO RELATED APPLICATIONS

This application is based upon and claims the benefit of priority of the prior Japanese Patent Application No. 2008-199925, filed on Aug. 1, 2008, the entire contents of which are incorporated herein by reference.

FIELD

The embodiment discussed herein is related to a method for designing a semiconductor device, a program therefor, and the semiconductor device.

BACKGROUND

A pattern of a typical semiconductor device is designed with a designing unit realized by a computer. The designing unit performs arrangement of power supply wiring, cells, and signal lines based on the specification of the semiconductor device to generate pattern data for the semiconductor device.

The power supply wiring has a multilayer structure. For example, the power supply wiring includes first power supply lines formed in parallel on a given wiring layer, such as a sixth wiring layer, along a given direction, such as a direction X, and second power supply lines formed in parallel on a wiring layer, such as a fourth wiring layer, which is different from the aforementioned wiring layer along a direction perpendicular to the first power supply lines, such as a direction Y. The first and second power supply lines are formed like a lattice, mesh, or net when a semiconductor chip is seen from the side on which the wiring is formed, e.g., in a plane view. The power supply wiring includes vias formed at intersection points of the first and second power supply lines on the two distinct wiring layers for electrically coupling the first and second power supply lines, and vias for coupling the first and second power supply lines or the like to power wiring in an element.

An example of the above-described vias is a stack via. The stack via includes vias stacked in the direction in which wiring layers are formed. Two groups of wiring formed on the wiring layers located separate from each other, such as a first wiring layer and the fourth wiring layer, may be coupled through the stack via.

The signal lines of the semiconductor device are formed on lower layers of the above-described wiring layers and near a substrate. However, when a semiconductor device with a large number of signal lines is desired, use of only the wiring layers located lower than the fourth wiring layer on which the second power supply lines are formed may not be enough to form all of the desired signal lines. Therefore, in the designing unit, the signal lines may be formed also on the fourth wiring layer on which the power supply lines are formed and a fifth wiring layer located higher than the fourth wiring layer.

When the signal lines are formed on the fifth wiring layer, the vias are formed on channels for forming the signal lines and a shortage of the channels for forming the signal lines may be caused. When the shortage of the channels is caused, changes such as enlarging the chip area or increasing the wiring layers may be made. When such changes are made, it is preferable to start again from the arrangement operation of the power supply wiring, which is an earlier operation in the design operations.

In a conventional technique, the number of vias for coupling power supply lines is reduced to increase the number of wiring channels.

As described above, the reduction of the number of the vias may result in a lessening of a physical amount of the power supply material for supplying the power supply voltage, e.g., the cross-sectional areas of the power supply lines and/or vias. The physical amount of the power supply material is inversely proportional to an amount of the power supply voltage drop, called "IR drop", from a pad to which external power is supplied to a cell located in a given position.

Thus, the conventional technique may not provide the cell in the given position with a desired power supply voltage.

SUMMARY

According to an aspect of an embodiment, a method for designing a semiconductor device includes setting a given region in a core region of the semiconductor device; computing a current consumption value of the given region based on a current consumption value of a cell included in the given region; computing an amount of a first power supply voltage drop from a power supply line for supplying the cell with a power supply voltage to a first position corresponding to the given region of a first power supply line based on the current consumption value and a resistance value of the first power supply line on a first wiring layer of the semiconductor device; computing a contact resistance value corresponding to the second position based on the current consumption value, the first power supply voltage drop, and an allowable power supply voltage drop set for a second position corresponding to the given region of a second power supply line on a second wiring layer different from the first wiring layer; and computing a number of vias for the given region based on a result of a comparison between a resistance value of a via coupling the first power supply line and the second power supply line and the contact resistance value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawings of which:

FIG. 12 illustrates arrangement positions of the vias according to an aspect of the embodiment;

FIG. 15 illustrates an arrangement of the vias according to an aspect of the embodiment; and FIG. 16 illustrates an arrangement of the vias according to an aspect of the embodiment.

DESCRIPTION OF EMBODIMENT

An embodiment is now described with reference to the drawings.

Figure 1:
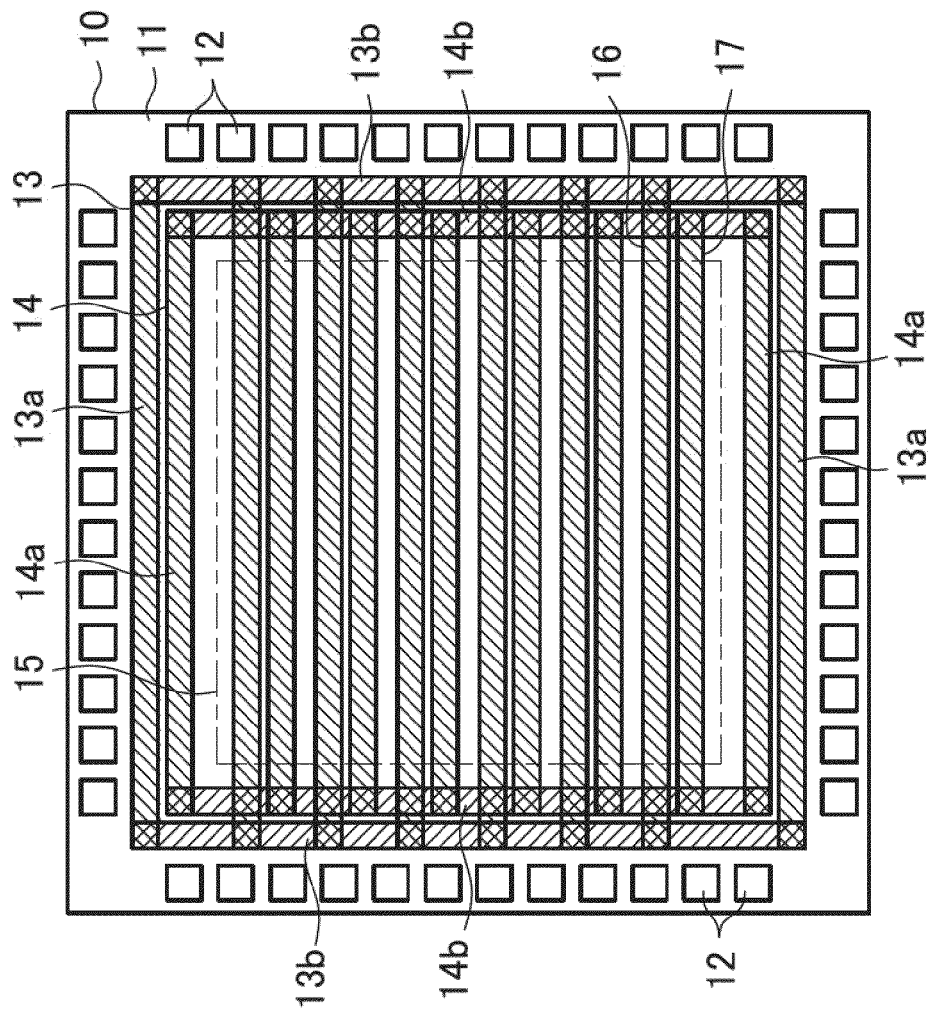
FIG. 1 is a plan view of a semiconductor device according to an aspect of an embodiment.

As illustrated in FIG. 1, pads 12 are formed along an outer edge of a rectangular substrate 11 of a semiconductor device 10. Power supply wiring 13 and power supply wiring 14 are formed inside the pads 12 and have each an outer frame. The power supply wiring 13 and the power supply wiring 14 are coupled electrically to given pads 12 through which power supply voltages VDD and VSS are supplied from the outside of the semiconductor device 10.

As further illustrated in FIG. 1, the power supply wiring 13 and the power supply wiring 14 include power supply lines 13a and 14a that are formed to extend along a given direction (e.g., the horizontal direction in FIG. 1) and power supply lines 13b and 14b that are formed to extend along a direction, for example, perpendicular to the power supply lines 13a and 14a. The power supply lines 13a and 14a are formed on a wiring layer different from the wiring layer on which the power supply lines 13b and 14b are formed. The semiconductor device 10 includes, for example, seven wiring layers. The power supply lines 13a and 14a are formed on an upper layer (e.g., a metal top layer or the highest layer being the seventh layer from the substrate 11). The power supply lines 13b and 14b are formed on an intermediate layer (e.g., a fourth layer). The power supply lines 13a are electrically coupled to the power supply lines 13b through vias (not depicted). The power supply lines 14a are electrically coupled to the power supply lines 14b through vias (not depicted). A rectangular core region 15 is provided inside the outer frames of the power supply wiring 13 and the power supply wiring 14.

Figure 2:
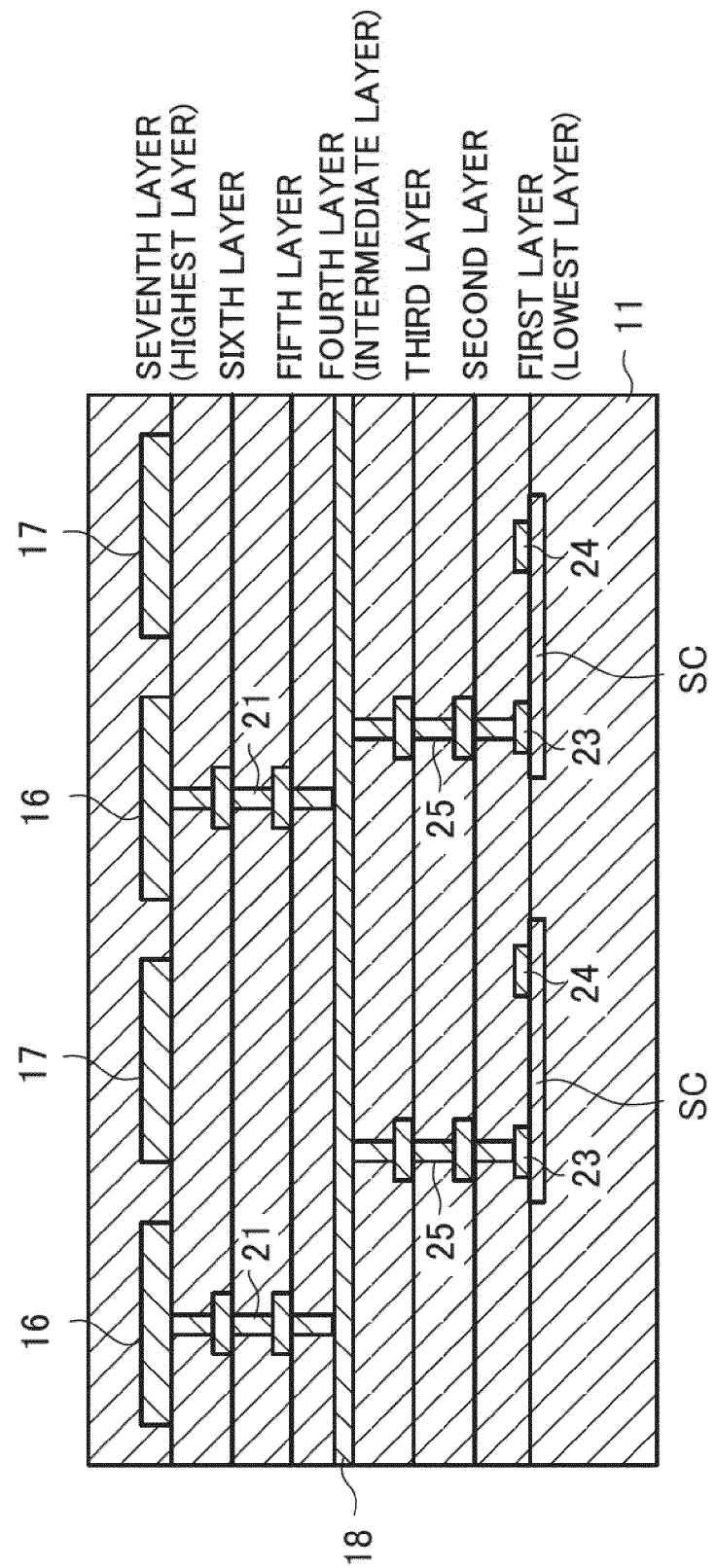
FIG. 2 is a sectional view of the semiconductor device in FIG. 1.

As illustrated in FIG. 2, cells SC are formed on the substrate 11 corresponding to the core region 15 in FIG. 1. Power supply lines 16 and 17 for supplying the cells SC with the power supply voltages VDD and VSS are formed over the core region 15 as first power supply wiring. Signal lines (not depicted) for coupling the cells SC are formed over the core region 15. Similar to the power supply lines 13a and 14a, for example, the power supply lines 16 and 17 are formed in the highest layer (e.g., the seventh layer). Power supply lines 18 and 19 that extend along the direction perpendicular to the power supply lines 16 and 17 are formed under the power supply lines 16 and 17 as second power supply wiring (refer to FIG. 3). The power supply lines 16 are electrically coupled to the power supply lines 13 through vias (not depicted). The power supply lines 16 are electrically coupled to power supply lines 18 through vias 21. The power supply lines 17 are electrically coupled to the power supply lines 14 through vias (not depicted). The power supply lines 17 are electrically coupled to the power supply lines 19 through vias 22 (not depicted).

As further illustrated in FIG. 2, the vias 21 couple the power supply lines 16 formed on the seventh layer and the power supply lines 18 formed on the fourth layer. The vias 21 are stack vias formed by stacking vias along the direction in which the wiring layers are formed as a stack. Specifically, the vias 21 are formed by stacking and coupling vias for coupling the wiring on the fourth layer and the wiring on the fifth layer, vias for coupling the wiring on the fifth layer and the wiring on the sixth layer, and vias for coupling the wiring on the sixth layer and the wiring on the seventh layer. Similarly, the vias 22 couple the power supply lines 17 formed on the seventh layer and the power supply lines 19 formed on the third layer. The vias 22 are stack vias formed by stacking vias along the direction in which the wiring layers are formed as a stack.

As further illustrated in FIG. 2, power supply lines 23 and 24 are formed on the cells SC. The power supply lines 23 and 24 are metal lines and formed on the lowest layer (e.g., a first layer).

Figure 5:
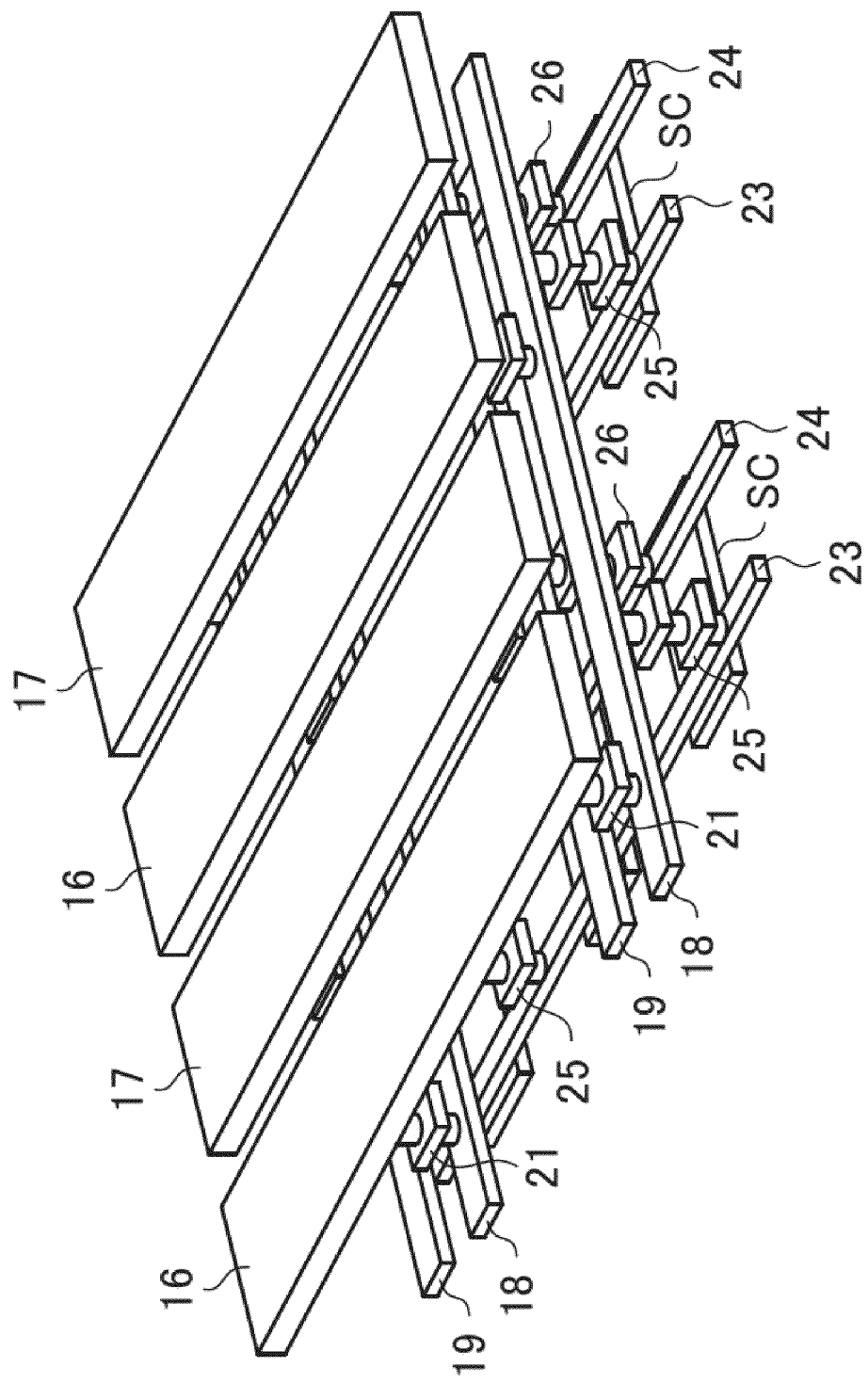
FIG. 5 is a perspective view of the power supply lines of the semiconductor device in FIG. 1.

Along with definition information on, for example, a shape or location of an element, such as a transistor, of the cell SC, the power supply lines 23 and 24 are included in a library as the power supply lines accompanying the cells SC. When the cells SC are formed in parallel along a given direction, pattern data of the power supply lines 23 and 24 of the cells SC are mutually coupled. When the pattern data of the power supply lines 23 and 24 of the cells SC are mutually coupled, the power supply lines are formed to extend along the direction in which the cells SC are arranged as illustrated in FIG. 5.

The power supply lines 23 are coupled to the power supply lines 18 formed on one of the intermediate layers through vias 25. The power supply lines 24 are coupled to the power supply lines 19 formed on one of the intermediate layers through vias 26. The vias 25 and 26 are stack vias formed similarly to the vias 21.

As further illustrated in FIG. 2, cross-sections of the power supply lines 16 and 17 formed in the highest layer have rectangular shapes. That is, the power supply lines 16 and 17 are formed to have band-like shapes. The widths of the power supply lines 16 and 17 are set so that the power supply lines 16 and 17 may supply all of the cells SC included in the core region 15 in FIG. 1 with a desired current. As a result, a wiring layer located lower than the wiring layer of the power supply lines 16 and 17 may be used as a region for the signal lines and the region for the signal lines may increase. In other words, the wiring may be arranged with higher efficiency.

As further illustrated in FIG. 2, when the power supply lines 23 on the cells SC are formed more or less immediately under the power supply lines 16 for supplying the power supply voltage VDD like the power supply line 23 on the cell SC on the right side, the power supply lines 16 and 23 may be coupled through the stack vias. When the power supply lines 23 on the cells SC are not formed immediately under the power supply lines 16 like the power supply line 23 on the cell SC on the left side of FIG. 2, the power supply voltage VDD may be supplied to given positions by flowing through the power supply lines 18 formed on one of the intermediate wiring layers (e.g., the fourth layer in FIG. 2) located between the wiring layer of the power supply lines 16 and the wiring layer of the power supply lines 23. The power supply lines 17 for supplying the power supply voltage VSS serve a similar purpose as the power supply lines 18 and detailed description thereof is omitted.

Figure 3:
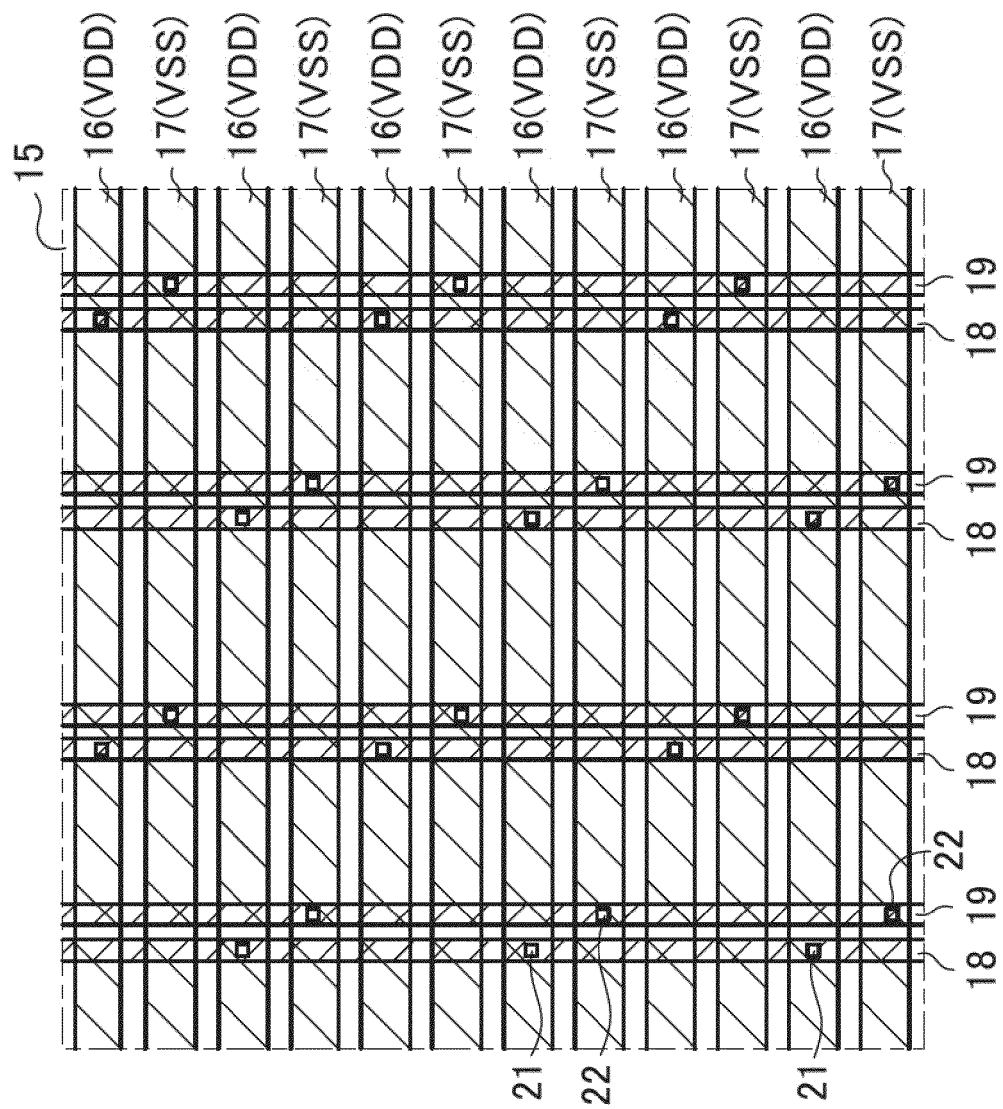
FIG. 3 illustrates power supply lines in the core region 15 in FIG. 1.

As illustrated in FIG. 3, the vias 21 are formed at some intersection points of the power supply lines 16 and the power supply lines 18 formed on one of the intermediate layers. Similarly, the vias 22 are formed at some of the intersection points of the power supply lines 17 and the power supply lines 19 formed on one of the intermediate layers. In the arrangement operation of the power supply wiring, which will be described later, the number of the vias 21 is set depending on a result of a comparison between a resistance value of the via 21 and a contact resistance value of the via 21. In the arrangement operation of the power supply wiring, which will be described later, the number of the vias 22 is set depending on a result of a comparison between a resistance value of the via 22 and a contact resistance value of the via 22. The contact resistance value is a value of a resistance between two wiring groups coupled through the vias 21 in a given unit area. As illustrated in FIG. 2, the vias 21 couple the power supply lines 16 and 18. The contact resistance in such a case is the resistance between the power supply lines 16, and the wiring group including the power supply lines 18 and the power supply lines located lower than the power supply lines 18 in a unit area. The contact resistance value is a value of the resistance obtained in the unit area between the wiring group including the power supply lines 16 and the wiring group including the power supply lines 18 and the power supply lines located lower than the power supply lines 18. The contact resistance value determines the power supply voltage value of the cell SC included in the unit area. The difference between the power supply voltage value of the cell SC and the power supply voltage value of the pad 12 depicted in FIG. 1 through which the power supply voltage is supplied in the semiconductor device 10 depicted in FIG. 1 is an amount of the power supply voltage drop, namely, the IR drop. The desired amount of the IR drop may be achieved by setting the numbers of the vias 21 and 22 depending on the contact resistance value. The numbers of the vias 21 and 22 become smaller than the numbers typically employed when forming the vias 21 and 22 at all of the intersection points of the power supply lines 16 to 19.

Figure 4:
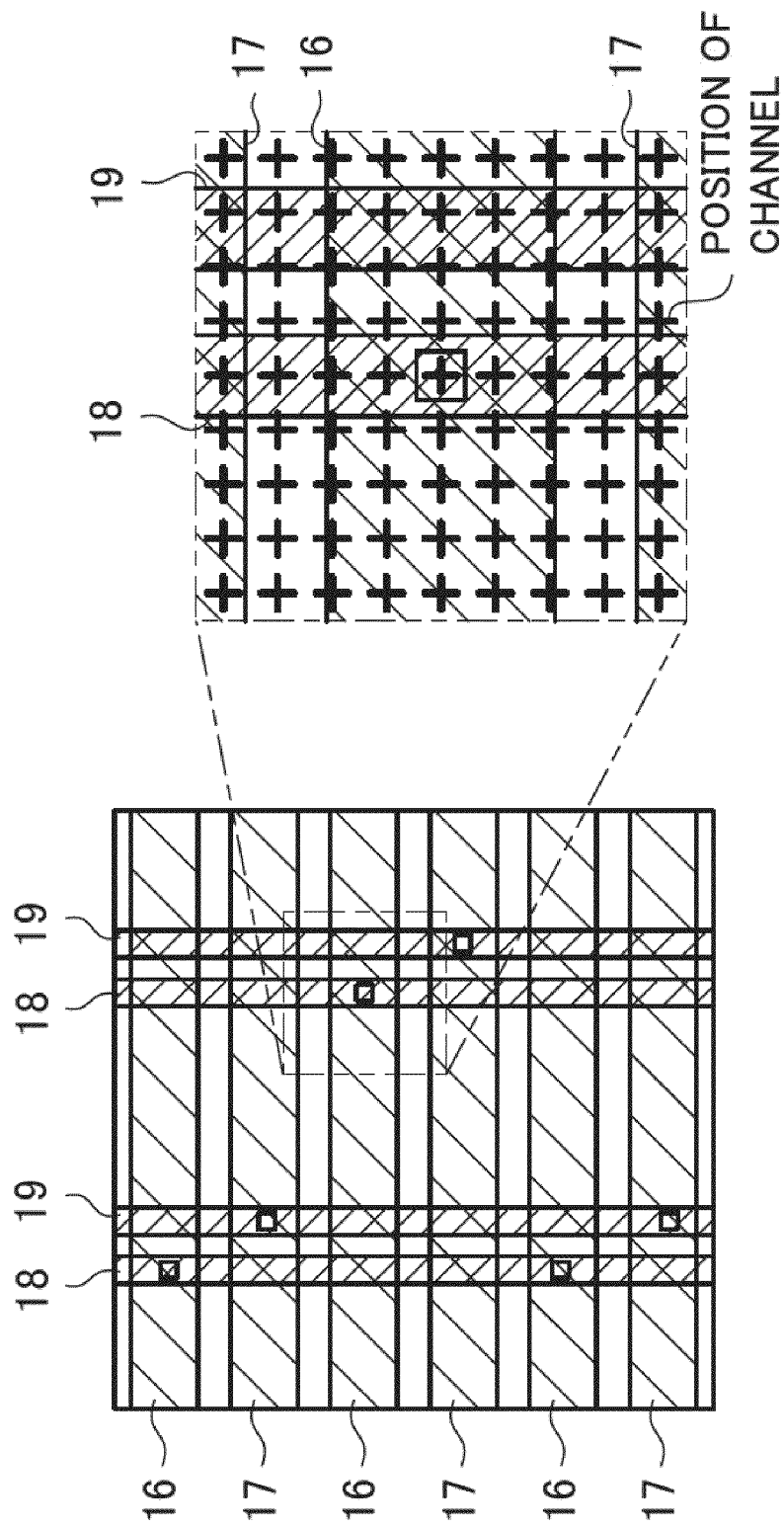
FIG. 4 is an enlarged view of the power supply lines in FIG. 3.

Crosses in FIG. 4 indicate positions of the channels where the signal lines or the like are formed. When the signal lines are formed along the horizontal direction in the enlarged view on the right side of FIG. 4, the vias 21 use one channel, for example. Thus, reduction of the loss of space due to too many vias 21 ensures that there is enough space for signal lines to improve the wiring efficiency.

Operations for designing a power supply structure of the above-described semiconductor device 10 in FIG. 1 are now described.

Figure 6:
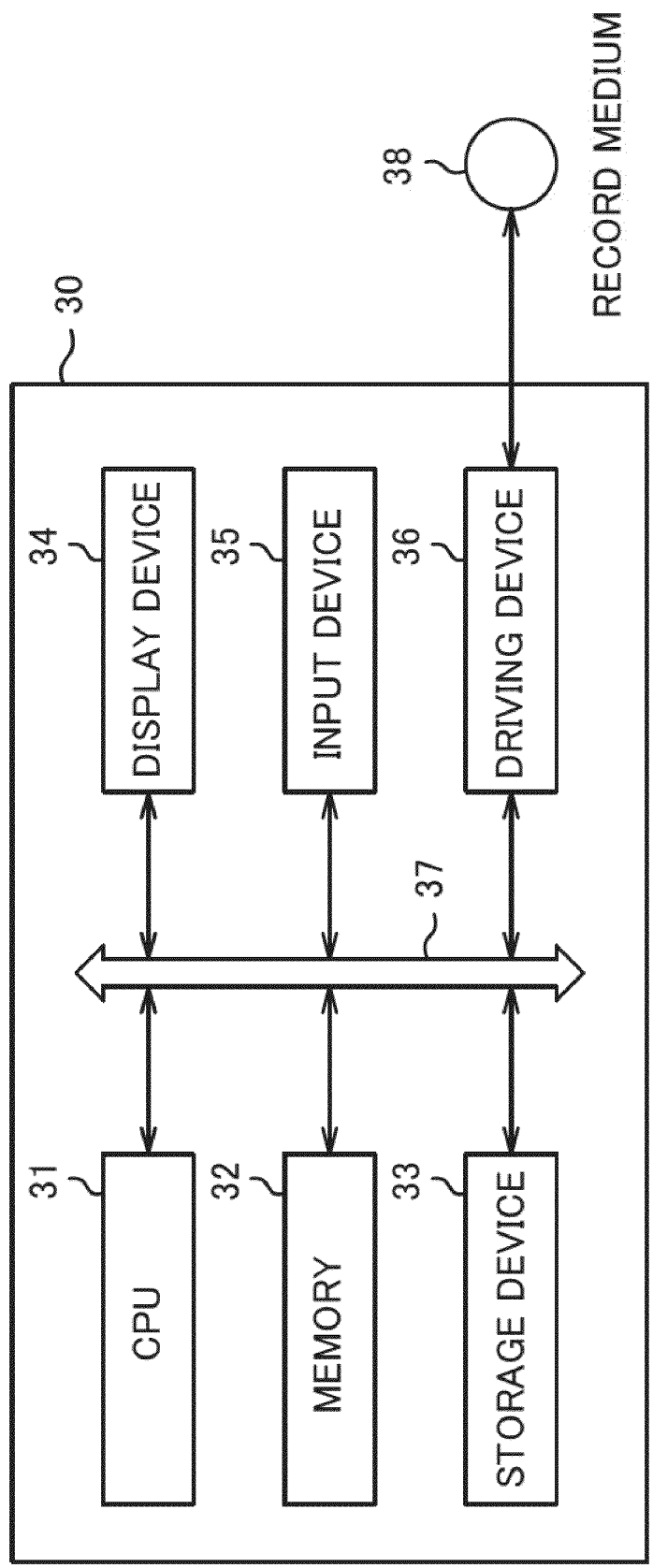
FIG. 6 illustrates a designing unit according to an aspect of the embodiment.

FIG. 6 illustrates a structure of a designing unit 30 for designing the power supply structure, an example of which is depicted in FIG. 5, of the semiconductor device 10 in FIG. 1.

As illustrated in FIG. 6, a typical computer-aided design (CAD) device may be used as the designing unit 30. The designing unit 30 includes a central processing unit (CPU) 31, a main memory (memory) 32, a storage device 33, a display device 34, an input device 35, and a driving device 36. The CPU 31, the memory 32, the storage device 33, the display device 34, the input device 35, and the driving device 36 are mutually coupled through a bus 37.

As further illustrated in FIG. 6, the CPU 31 executes a program through the memory 32 to perform desired processes for the wiring design operations. The program and data for providing functions for the wiring design are stored in the memory 32. For example, a cache memory, system memory, or display (graphics) memory may be used as the memory 32. The display device 34 is used for displaying a design result, design-conditions entry screen, and the like. For example, a cathode ray tube (CRT), a liquid crystal display (LCD), or a plasma display panel (PDP) may be used as the display device 34. The input device 35 is used for inputting requests and instructions from a user as well as processing conditions. For example, a keyboard or mouse may be used as the input device 35. For example, a magnetic disk drive, an optical disk drive, a magneto-optical disk drive, or a solid-state drive (SSD) may be used as the storage device 33. Program data (hereinafter referred to as a "program") for the wiring design and data files (hereinafter referred to as "files") are stored in the storage device 33. In response to an instruction from the input device 35, the CPU 31 transfers the program and the data stored in the file as desired to the memory 32 and sequentially executes operations depending on the program and the data stored in the file. The storage device 33 may be used as a database. The program and layout data used by the CPU 31 are provided by a record medium 38. The driving device 36 reads the program out of the record medium 38 and installs the read program into the storage device 33. For example, a computer-readable recording medium, such as a memory card, a flexible disk, an optical disk (CD-ROM, DVD-ROM, . . . ), or a magneto-optical disk (MO, MD, . . . ), may be used as the record medium 38. The above-described program may be used when desired after being stored in the record medium 38 and loaded in the memory 32. The record medium 38 preferably provides a program file or a data file. As the record medium 38, a record medium inserted in a storage device or a driving device, which is included in another computer or server, and coupled to the designing unit 30 through a network may be used.

Figure 7:
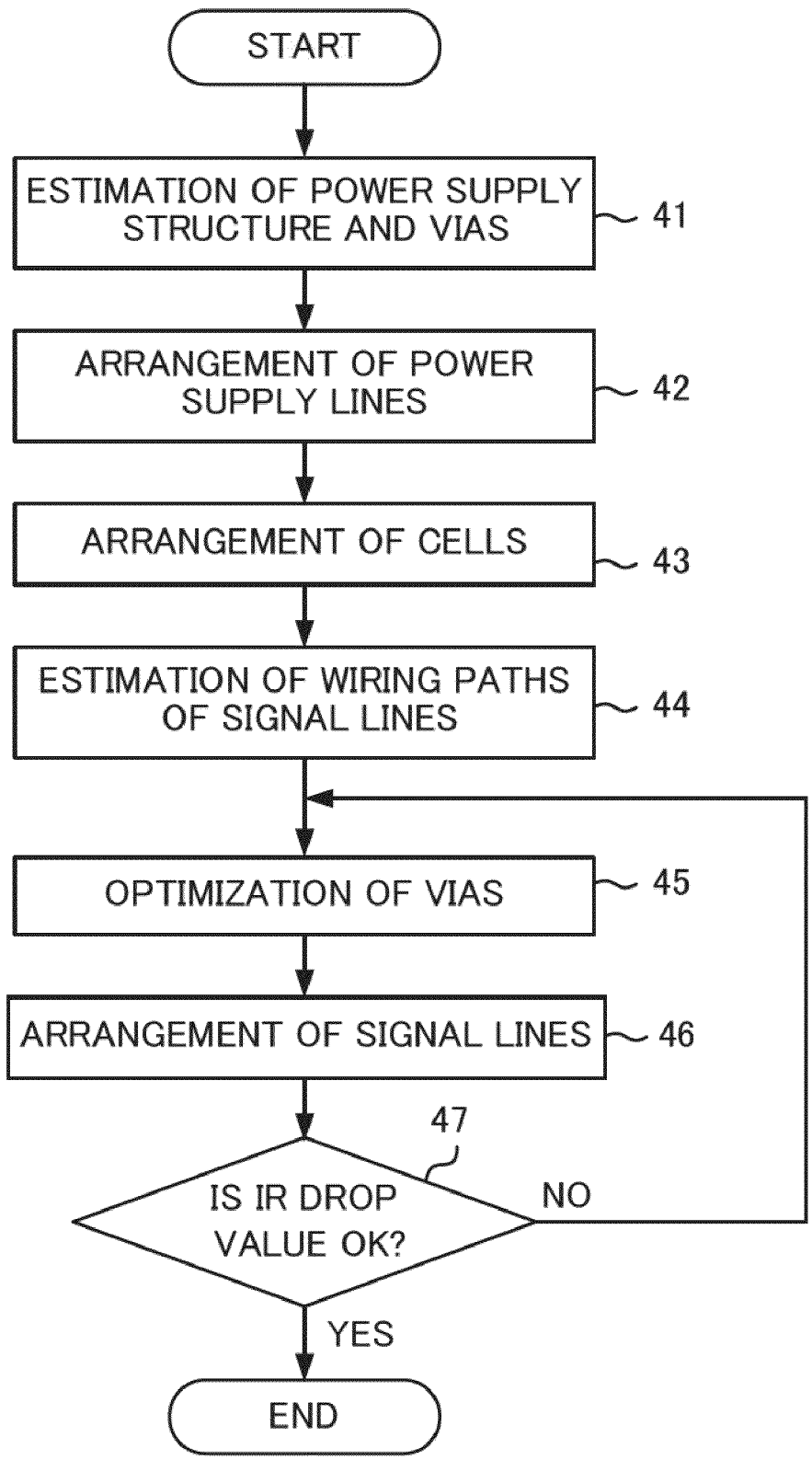
FIG. 7 illustrates wiring design operations according to an aspect of the embodiment.

The designing unit 30 in FIG. 6 generates layout data for the semiconductor device 10 in FIG. 1 by performing the wiring design operations in accordance with the flowchart in FIG. 7. The layout data for the semiconductor device 10 includes data for forming the power supply lines and signal lines that are included in the core region 15 illustrated in FIG. 1.

As illustrated in FIG. 7, the designing unit 30 in FIG. 6 reads the data stored in the storage device 33 in FIG. 6 to estimate an arrangement of the power supply lines and power supply vias (Operation 41). The storage device 33 in FIG. 6 stores the information on the specifications of the semiconductor device 10 in FIG. 1, libraries such as the shapes of chips, the net list of the semiconductor device 10 in FIG. 1, and the like. The designing unit 30 in FIG. 6 computes an amount of current consumption of the semiconductor device 10 in FIG. 1 based on the data read out of the storage device 33 in FIG. 6 to determine the arrangement, e.g., the number of the power supply lines to be formed in the highest layer of the semiconductor device 10 in FIG. 1, based on the computed amount of the current consumption. The designing unit 30 in FIG. 6 generates a combined resistance model of the power supply lines in the unit area in the core region 15 in FIG. 1 and computes the contact resistance value based on the combined resistance model. The designing unit 30 in FIG. 6 determines the number of vias in the unit area based on a result of the comparison between the contact resistance value and the resistance value of the via.

As further illustrated in FIG. 7, the designing unit 30 in FIG. 6 arranges the power supply lines based on the result of the estimation operation (Operation 42). The designing unit 30 in FIG. 6 generates a pattern data for the semiconductor device 10 in FIG. 1 based on the data about the shapes of the chips and pads and the like read out of the library of the storage device 33 in FIG. 6, and stores the pattern data in the storage device 33. The pattern data includes the shape of the substrate 11 of the semiconductor device 10 in FIG. 1, the shapes and positions of the pads and the shapes and positions of the power supply lines 13, 14, 16, 17, and 18.

As further illustrated in FIG. 7, the designing unit 30 in FIG. 6 arranges the positions of the cells in respect to the core region 15 in FIG. 1 (Operation 43). The designing unit 30 in FIG. 6 estimates wiring paths of the signal lines coupling the arranged cells (Operation 44). The designing unit 30 in FIG. 6 optimizes the power supply vias based on the result of the estimation of the wiring paths to determine the arrangement positions of the power supply vias (Operation 45).

As further illustrated in FIG. 7, the designing unit 30 in FIG. 6 arranges the positions of the signal lines to generate the layout data for the semiconductor device 10 in FIG. 1, and stores the layout data in the storage device 33 (Operation 46). The layout data includes data about types and arrangement positions of the cells in the semiconductor device 10 in FIG. 1, and data about shapes and arrangement positions of the signal lines, power supply lines, and vias.

As further illustrated in FIG. 7, the designing unit 30 in FIG. 6 checks the amount of the power supply voltage drop or the IR drop (Operation 47). When the drop amount satisfies the specification, the designing unit 30 in FIG. 6 finishes the wiring design operation. Alternatively, when the drop amount does not satisfy the specification, the designing unit 30 in FIG. 6 performs the optimization of the power supply vias by returning to Operation 45.

As described above with reference to FIG. 7, since the desired channels for the signal lines are obtained through the optimization operations of the arrangement of the power supply lines and power supply vias, all of the signal lines may be arranged in the arrangement operation of the signal lines. As a result, repeated operations for the signal lines may be reduced to shorten the designing time.

The operations in FIG. 7 are described in detail below.

In the embodiment, the operations for the power supply lines that supply the power supply voltage VDD are mainly described. However, the operations for the power supply lines that supply the supply voltage VDD may be applied to the power supply lines that supply the supply voltage VSS.

As further illustrated in FIG. 7, in Operation 41, the designing unit 30 in FIG. 6 estimates the arrangement of the power supply lines and power supply vias. The designing unit 30 in FIG. 6 determines the shape of the chip of the semiconductor device 10 in FIG. 1 as well as the numbers and arrangement positions of the power supply lines 16 to 19 for the core region 15 in FIG. 1.

Figure 8A:
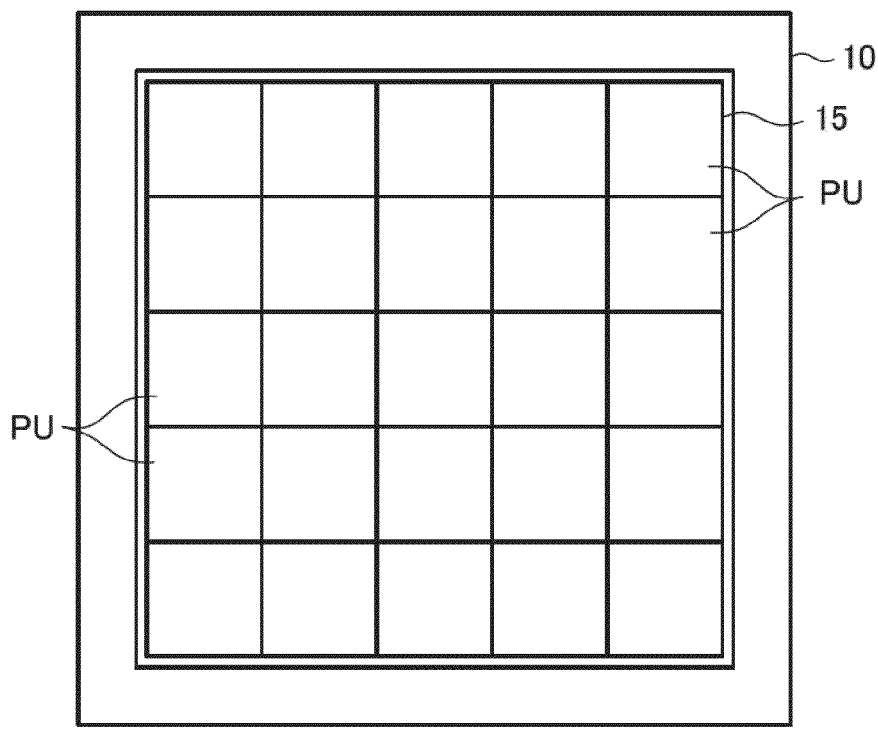
FIG. 8A illustrates power units for the semiconductor device in FIG. 1.

As illustrated in FIG. 8A, the designing unit 30 in FIG. 6 divides the core region 15 in FIG. 1 into unit areas PU. The unit area PU is referred to as a "power unit PU" hereinafter. In FIG. 8A, the core region 15 is divided into five rows and columns, for example.

Figure 8B:
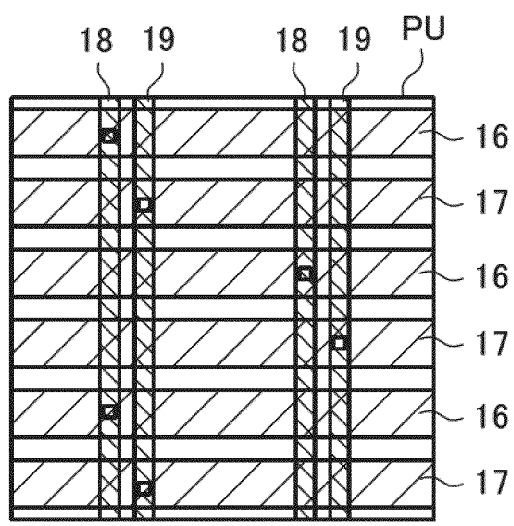
FIGS. 8B and 8C illustrate any one of the power units in FIG. 8A.
Figure 8C:
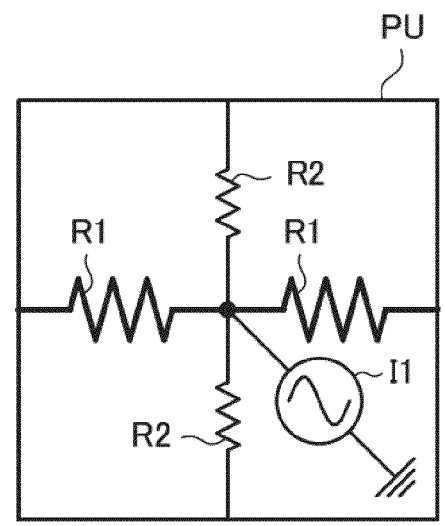

As illustrated in FIG. 8B, the designing unit 30 in FIG. 6 generates a combined resistance model corresponding to the arrangement of the power supply lines included in the power unit PU. The power unit PU includes three of the power supply lines 16 and two of the power supply lines 18, for example. In FIG. 8C, two resistances R1 represent wiring resistances of the three power supply lines 16 in FIG. 8B and are depicted in the arrangement direction of the power supply lines 16 in FIG. 8B. Similarly, in FIG. 8C, two resistances R2 represent wiring resistances of the two power supply lines 18 in FIG. 8B and are depicted in the arrangement direction of the power supply lines 18 in FIG. 8B. In FIG. 8C, the resistance R1 has a resistance value lower than that of the resistance R2 depending on the physical amount of the power supply lines 16 and 18 in FIG. 8B that are included in a single power unit PU.

When the whole amount of the current consumption in the core region 15 of the semiconductor device 10 in FIG. 1 is divided by the number of the power units PU in FIG. 8A by the designing unit 30 in FIG. 6, the result is set to be the amount of the current consumption in the power unit PU. The designing unit 30 in FIG. 6 couples a current source I1 for supplying the current amount substantially equal to the amount of the current consumption in a single power unit PU to the intersection point of the combined resistance model in FIG. 8B.

The number by which the core region 15 in FIG. 8A is divided may be set based on the operation for computing the power supply voltage drop of the power supply lines 16 and 17 that are basic wiring elements. For example, the designing unit 30 in FIG. 6 sets the number by which the core region 15 in FIG. 8A is divided to compute the power supply voltage drop at the center of each of the power supply lines 16 and 17 so that the center of the power supply lines 16 and 17 may be the intersection point of the combined resistance model in the central power unit PU of the power units PU formed by being divided in the arrangement direction of the power supply lines 16 and 17. For example, the core region 15 in FIG. 8A is divided into an odd number of the power units PU along the arrangement direction of the power supply lines 16 and 17. Since there are no limits in the arrangement direction of the power supply lines 16 and 17 and the direction perpendicular to the power supply lines 16 and 17, the core region 15 in FIG. 8A is divided into an odd or an even number of the power units PU along the arrangement direction of the power supply lines 16 and 17 and the direction perpendicular to the power supply lines 16 and 17.

The designing unit 30 in FIG. 6 provides a power source (power supply voltage VDD1) to both ends of the power supply line 16 in FIG. 1. The combined resistance model of the power supply line 16 in FIG. 1 is the resistance R1 of the power unit PU depicted in FIG. 8C.

Figure 9:
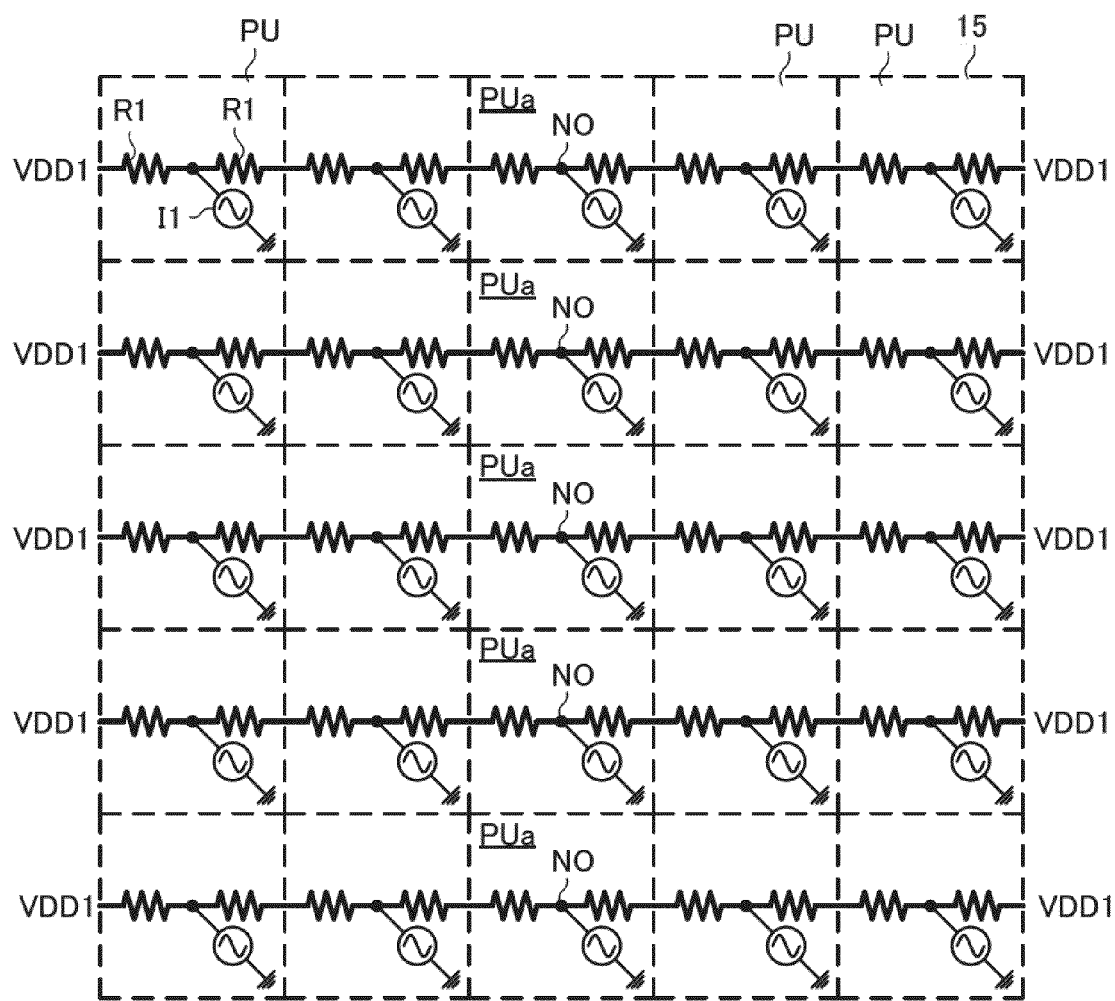
FIG. 9 illustrates power supply resistance models for the core region in FIG. 8A.

Accordingly, as illustrated in FIG. 9, the designing unit 30 in FIG. 6 provides both ends of each line of the resistances R1 in the power units PU in the core region 15 in FIG. 8A with the power supply voltage VDD1. The designing unit 30 in FIG. 6 computes the difference between the voltage at a node NO at the intersection point of the central power unit PUa and the power supply voltage VDD1 as the central power supply voltage drop relative to the end of the power supply line 16.

The number by which the core region 15 is divided along the arrangement direction of the power supply line 16 is represented by "n," and the number by which the core region 15 is divided along the direction perpendicular to the power supply line 16 is represented by "m." The current amount of the current source I1 of each power unit PU is given the same reference numeral, I1, and the resistance value of the resistance R1 is given the same reference numeral, R1. A total current consumption "It" may be expressed by the equation (1).

$$It = I1 * m * n \quad (1)$$

A resistance value Rc of a basic line from the end of the core region 15 to the central node NO may be expressed by the following equation: Rc=R1*n.

A voltage Vn at the node NO may be expressed by the equation (2).

$$Vn = (n/2 * It * Rc/(n*n*m)) + \Sigma((n/2-1)*It*Rc/(n*n*m)) \quad (2)$$

A power supply voltage drop IRD at the node NO may be expressed by the equation (3).

$$IRD = VDD1 - Vn \qquad (3)$$
$$= VDD1 - (n/2 * It * Rc/(n*n*m)) -$$
$$\Sigma((n/2 - 1) * It * Rc/(n*m*n))$$

Figure 10B:
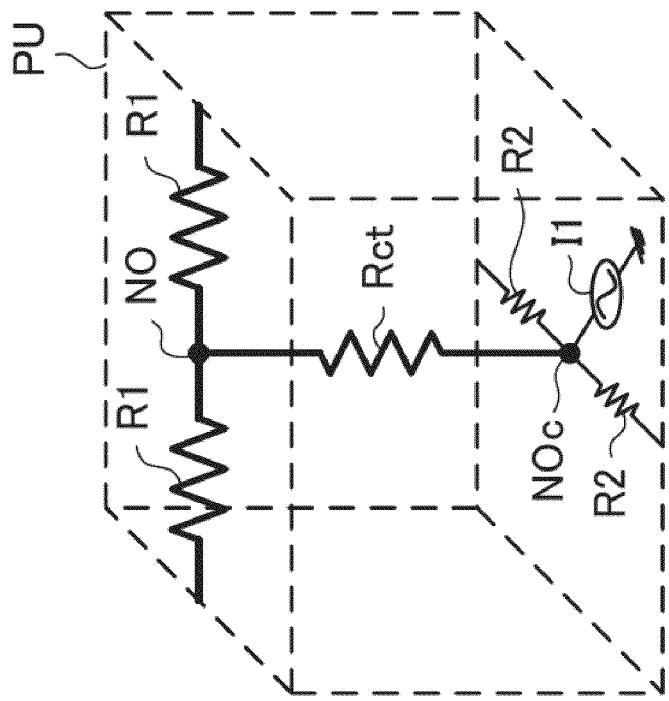
FIGS. 10A and 10B illustrate the power supply resistance models of the power unit.
Figure 10A:
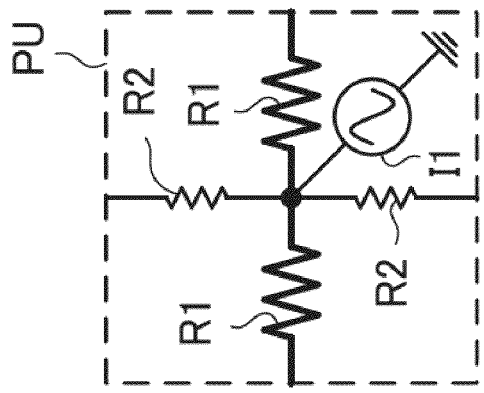

As illustrated in FIGS. 10A and 10B, the designing unit 30 in FIG. 6 provides a resistance model of the via 21 as a contact resistance (Rcontact) to the central power unit PU of the core region 15, namely, the power unit PUa in FIG. 9 for which the node NO is set. The central power unit PU is located in the center of the power supply line 16.

As further illustrated in FIGS. 10A and 10B, when the resistance model of the via 21 is provided as the contact resistance (Rcontact) to the node NO of the combined resistance model of the plane power unit PU, which is depicted in FIG. 10A, the three-dimensional power unit PUa in which the resistances R1 of the highest layer and the resistances R2 of the intermediate layers as well as the current source I1 are coupled through the contact resistance (Rcontact) is generated as illustrated in FIG. 10B. In the three-dimensional power unit PUa, the upper end of the contact resistance (Rcontact) is the node NO and the bottom end of the contact resistance (Rcontact) is a node NOc. A voltage Vnc at the node NOc is a voltage obtained by subtracting a dropped voltage between both ends of the contact resistance (Rcontact) from the voltage Vn. The voltage Vnc at the node NOc may be expressed by the equation (4)

$$Vnc = Vn - Rct * I1 \qquad (4)$$

where the resistance value of the contact resistance (Rcontact) is represented by Rct.

Since the power supply voltage drop from the node NOc to the cell SC in FIG. 2 is much smaller than the power supply voltage drop (IR drop) from the pad 12 in FIG. 1 through which the VDD1 is supplied to the node NOc, the power supply voltage drop from the node NOc to the cell SC in FIG. 2 may be ignored in the computing. Thus, when a target value of the power supply voltage drop (an allowable power supply voltage drop) in the cell SC in FIG. 2 for the pad 12 in FIG. 1 is represented by a target IR drop Td, the value of the target IR drop Td may be expressed by the equation (5).

$$Td = VDD1 - Vnc \qquad (5)$$
$$= VDD1 - (Vn - Rct * I1)$$
$$= (n/2 * It * Rc/(n*n*m)) +$$
$$\Sigma((n/2 - 1) * It * Rc/(n*n*m) + Rcontact * I/(n*m))$$

Accordingly, the resistance value Rct in FIG. 10B of the contact resistance (Rcontact) may be expressed by the equation (6).

$$Rct = Td * n * m/It - (n/2 * Rc/n) - \Sigma((n/2-1) * Rc/n) \qquad (6)$$

When the resistance value of the via 21 is represented by Rv, the number X of the vias 21 desired for the power unit PU in FIG. 9 may be expressed by the equation (7) using the resistance value Rv of the via 21 and the resistance value Rct of the contact resistance (Rcontact).

$$X = Rv/Rct \qquad (7)$$

As further illustrated in FIG. 7, in Operation 42, the designing unit 30 in FIG. 6 arranges the positions of the power supply lines based on the result of the estimation of the power supply lines and vias, and stores the layout data of the semiconductor device 10 in FIG. 1 including the power supply lines in the storage device 33. The designing unit 30 in FIG. 6 may arrange the number X vias 21 in the power unit PU in FIG. 8B when the number X of the vias 21 desired for the power unit PU in FIG. 8B is equal to or smaller than the number of the intersection points of the power supply lines 16 and 18 in FIG. 8B in the power unit PU in FIG. 8B. The power supply lines 16 in FIG. 8B and the power supply lines 18 in FIG. 8B are electrically coupled through the number X of vias 21 thus arranged.

Figure 11:
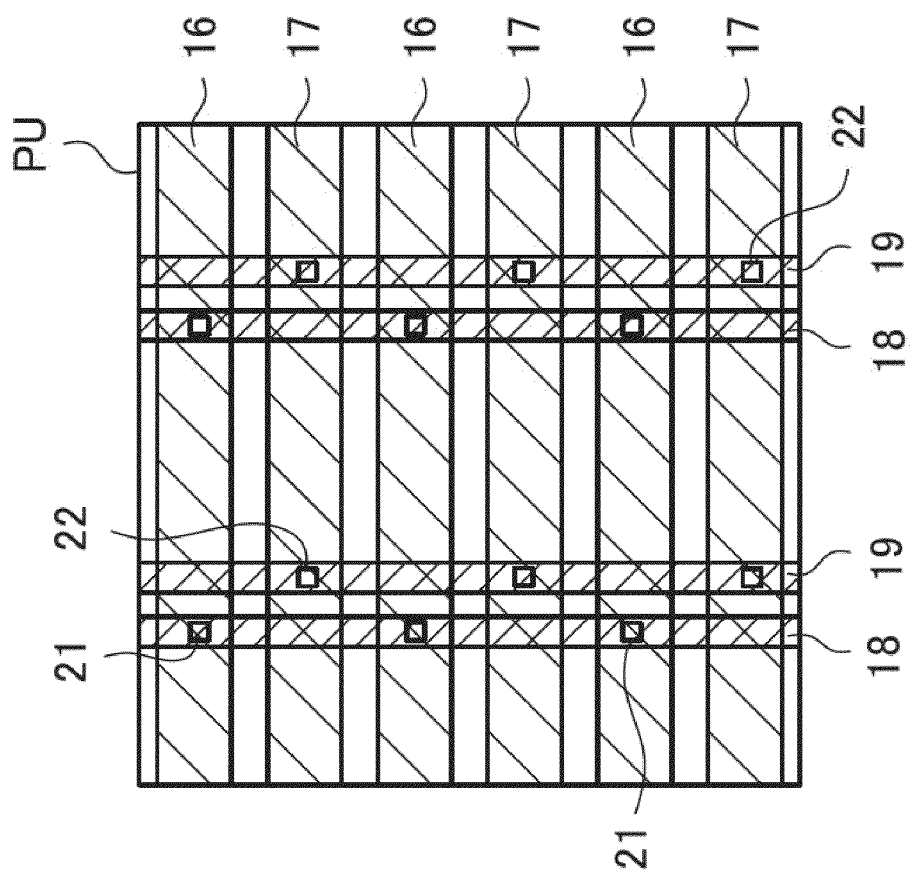
FIG. 11 illustrates an arrangement of vias according to an aspect of the embodiment.

As illustrated in FIG. 11, when the number X is six, for example, the vias 21 are arranged at the intersection points of the power supply lines 16 and 18.

As illustrated in FIG. 12, when the number X is three, for example, three vias 21 may be arranged evenly in the power unit PU. The even arrangement may be performed also in the other power units PU.

When the number X is larger than the number of the intersection points, the designing unit 30 in FIG. 6 changes the shape of the via 21 so that the number X may be a number equal to or less than the number of the intersection points. For example, when the cross-sectional area of the via 21 is increased, the resistance value Rv of the via 21 decreases and the number X of the desired vias 21 is reduced. The designing unit 30 in FIG. 6 may increase the number of the intersection points by increasing the number of the power supply lines 18.

As further illustrated in FIG. 7, in Operation 43, the designing unit 30 in FIG. 6 determines the arrangement positions of the cells in the core region 15 and stores the information on the determined arrangement positions in the storage device 33 as part of the layout data.

As further illustrated in FIG. 7, in Operation 44, the designing unit 30 in FIG. 6 estimates the wiring paths of the signal lines for coupling the cells based on the information on the arrangement positions of the cells and the net list stored in the storage device 33 in FIG. 6. Also in Operation 44, the designing unit 30 in FIG. 6 provisionally arranges the vias 21 desired for the cells arranged in each of the power units PU. Specifically, the designing unit 30 in FIG. 6 computes the amount of the current consumption in each of the power units PU based on the arrangement information of the cells. The amount of the current consumption of the cell is stored in the library of the storage device 33 in FIG. 6. The designing unit 30 in FIG. 6 reads the amount of the current consumption of the cells included in each of the power units PU out of the library, computes the total amount of the current consumption of the cells included in every power unit PU, associates each of the computed current consumption values with each of the power units PU, and stores the computed current consumption values in the storage device 33 or memory 32 in FIG. 6. The designing unit 30 in FIG. 6 computes the power supply voltage at the central node NO of each of the power units PU.

Figure 14:
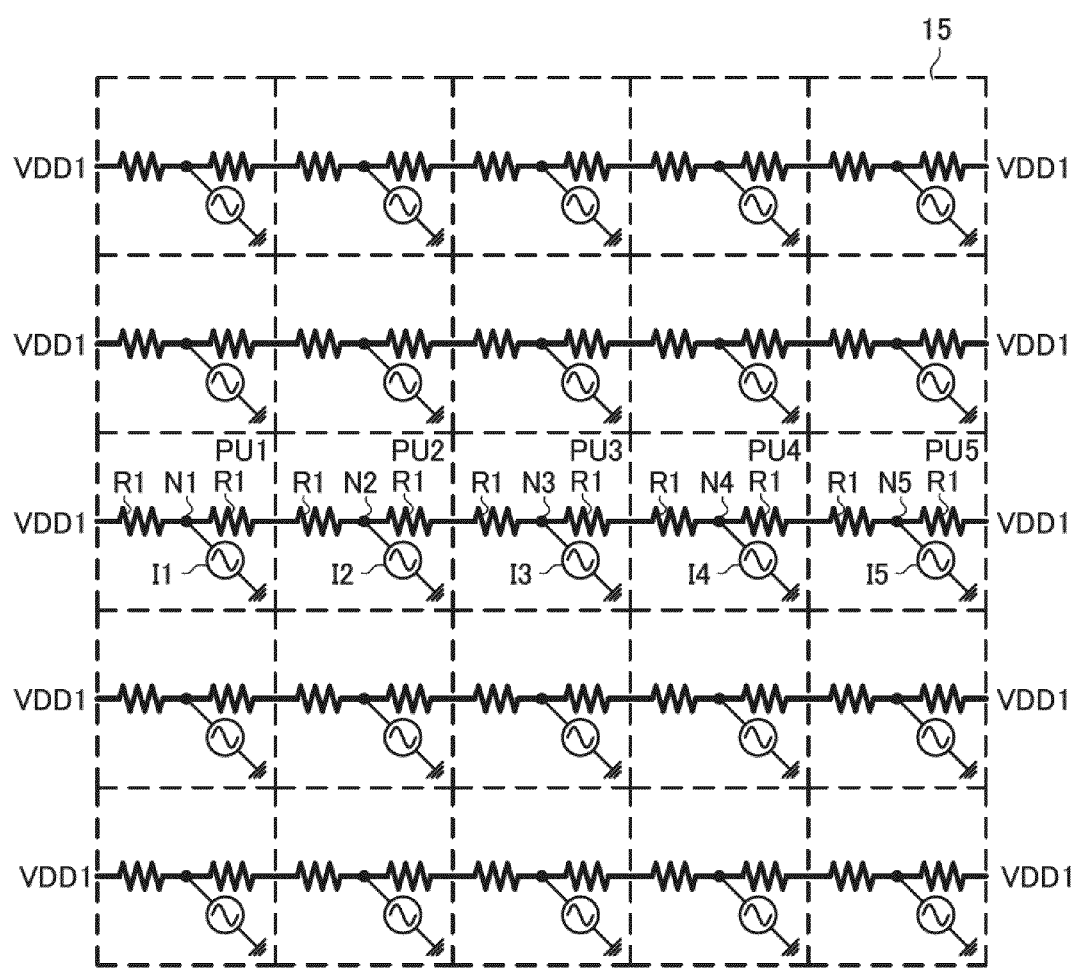
FIG. 14 illustrates the power supply resistance models of the core region according to an aspect of the embodiment.

Referring to FIG. 14, an example of the computing of the power supply voltage of each of nodes N1 to N5 located in the center of each of the power units PU1 to PU5 is described below.

The total value of the amount of the current consumption of the cells SC included in the power unit PU is computed for each of the power units PU1 to PU5. The current amounts of the current sources I1 to I5 included in the power units PU1 to PU5 are represented by I1 to I5, respectively. An equivalent resistance value of the power supply line 16 included in each of the power units PU1 to PU5 is R1. Thus, power supply voltages Vn1 to Vn5 at the central nodes N1 to N5 of the power units PU1 to PU5 may be expressed respectively by the following equations:

$$Vn1 = VDD1 - (I1+I2+I3)*R1;$$

$$Vn2 = Vn1 - (I2+I3)*2*R1;$$

$$Vn3 = Vn2 - I3*2*R1 \text{ (or } = Vn4 - I3*2*R1);$$

$$Vn4 = Vn5 - (I3+I4)*2*R1; \text{ and}$$

$$Vn5 = VDD1 - (I3+I4+I5)*R1.$$

The designing unit 30 in FIG. 6 computes the value of the contact resistance (Rcontact) of each of the power units PU1 to PU5 with the aforementioned equations (2) to (6). Using the aforementioned equation (7), the designing unit 30 in FIG. 6 computes the number X of the vias 21 desired for each of the power units PU1 to PU5 based on the value of the contact resistance (Rcontact) computed for each of the power units PU1 to PU5 and the resistance value Rv of the via 21. The designing unit 30 in FIG. 6 provisionally arranges the number X vias in the power unit PU.

Figure 13B:
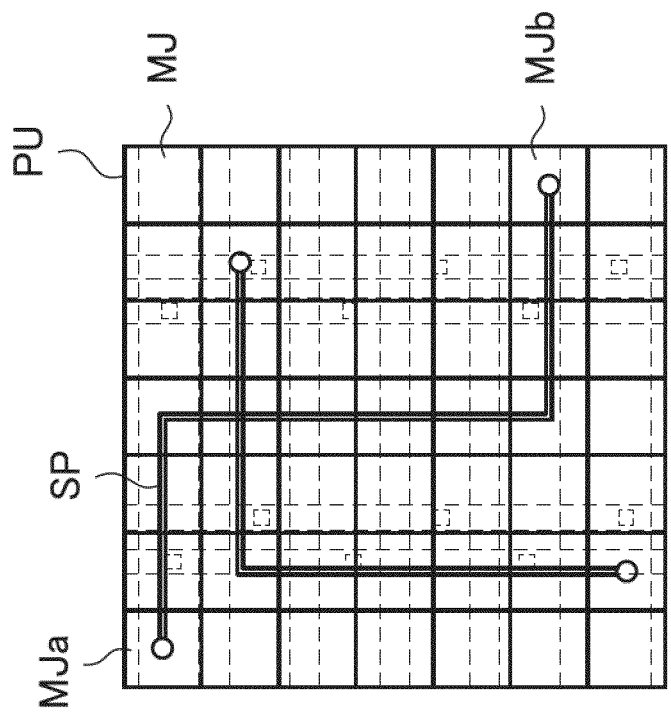
FIGS. 13A and 13B illustrate coupling paths between modules according to an aspect of the embodiment.
Figure 13A:
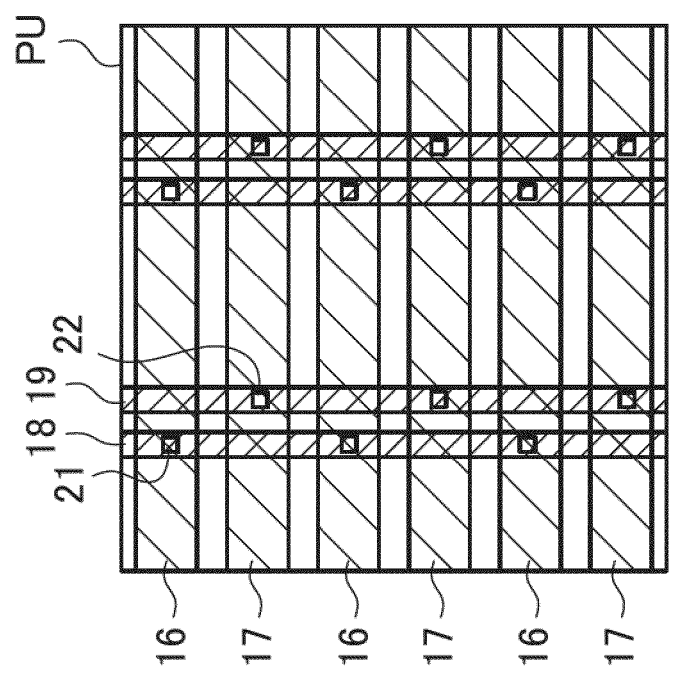

FIG. 13A illustrates an example in which the computed number of the vias for the power unit PU is six.

As illustrated in FIG. 13A, the designing unit 30 in FIG. 6 divides each of the power units PU into regions each of which has a given size that is an integral multiple of the width of the wiring channel, for example, and each of the regions is referred to as a module MJ. The designing unit 30 in FIG. 6 finds coupling points of the cells SC included in the power unit PU based on the arrangement positions and the library data of the cells SC, and identifies the modules MJ in which the coupling points are included. The designing unit 30 in FIG. 6 extracts coupling paths between the modules MJ that are on the same nets with respect to every net in the net list stored in the storage device 33 in FIG. 6.

As illustrated in FIG. 13B, modules MJa and MJb are on the same net, for example. The designing unit 30 in FIG. 6 extracts a coupling path SP for coupling the modules MJa and MJb. The designing unit 30 in FIG. 6 stores information on all of the modules MJ included in the extracted coupling paths SP in the storage device 33 in FIG. 6. For example, the information may be used for identifying the modules and includes coordinates of the modules.

As illustrated in FIG. 15, the designing unit 30 in FIG. 6 checks the number of the extracted coupling paths in the modules MJ and extracts modules in which the number of the nets set as the coupling paths is equal to or larger than a given threshold. For example, modules MJc depicted by hatching in FIG. 15 are modules in which the number of the coupling paths is large.

As further illustrated in FIG. 16, modules in which the number of the coupling paths is large are modules in which multiple signal lines may be formed and also modules in which the signal lines may be congested. A region A1 formed by the modules in which the number of the coupling paths is large, which is indicated by a dashed-dotted line, is a region with a relatively large number of the signal lines. Thus, the designing unit 30 in FIG. 6 identifies the region A1 as a non-arrangement region of the vias 21 and optimizes the arrangement positions of the vias 21 in the power unit PU in the region A1 of which the vias 21 are provisionally arranged to reduce losses of the channels caused by the vias 21.

As illustrated in FIG. 16, for example, the designing unit 30 in FIG. 6 cancels the provisional arrangement of the vias 21 and identifies the region with a relatively small number of the signal lines, e.g., a region A2 that is not hatched in FIG. 15, and includes the modules MJ in which the number of the coupling paths is smaller than the threshold as an arrangement region of the vias 21 to evenly arrange the computed number X of the vias 21. As a result, the vias included in the region with a relatively large number of the signal lines may be reduced to ensure a larger number of the channels for the signal lines. Furthermore, the power supply lines are formed as estimated by arranging the vias 21 desired for the power unit PU in the power unit PU. Thus, the power supply lines and the signal lines are designed so that the IR drop value may not exceed the target IR drop value.

When the power unit PU has a large number of the modules in which the number of the coupling paths is large, e.g., when more than a half of the modules of the power unit PU are modules in which the number of the coupling paths is large, the designing unit 30 in FIG. 6 may optimize the arrangement positions of the vias 21 in the power unit PU as well as those in the adjacent power units PU. That is, the number of vias 21 desired for the power units PU in which the number of the coupling paths is large may be arranged evenly in the regions that are formed by the modules with a small number of the coupling paths and selected from the power units PU adjacent to the power units PU in which the number of the coupling paths is large. As a result, the number of the vias 21 for the power unit PU including a large number of the modules in which the number of the coupling paths is large may be reduced and a current amount desired for the power unit PU may be ensured through use of the adjacent power units PU as part of the arrangement region of the vias 21.

The designing unit 30 in FIG. 6 determines the arrangement positions of the vias 21 as described above and stores the determined arrangement positions of the vias 21 in the storage device 33 in FIG. 6 as part of the layout data. As further illustrated in FIG. 7, in Operation 46, the designing unit 30 in FIG. 6 arranges the signal lines for coupling the cells, determines the arrangement positions of the signal lines and the vias for the wiring layers, and generates the layout data of the semiconductor device in FIG. 1.

As further illustrated in FIG. 7, in Operation 47, the designing unit 30 in FIG. 6 analyzes the power supply lines based on the generated layout data and checks whether or not the IR drop value exceeds the target IR drop value. When the IR drop value is smaller than the target IR drop value, the designing unit 30 in FIG. 6 finishes the wiring design operations.

As further illustrated in FIG. 7, when the IR drop value exceeds the target IR drop value, the designing unit 30 in FIG. 6 performs Operation 45 again. In Operation 45, the designing unit 30 in FIG. 6 repeats the optimization of the arrangement positions of the vias 21 to change the above-described conditions of the optimization.

For example, the designing unit 30 in FIG. 6 may increase the threshold with which a module is identified as the module in which the number of the coupling paths is large. For example, when the module in which the number of the nets used in the above-described operation is three or more is identified as the module in which the number of the coupling paths is large, the conditions may be changed at the time of repeating the optimization so that the module in which the number of the nets is five or more may be identified as the module in which the number of the coupling paths is large. Thereby, an area of the region A1 including the modules MJ in which the number of the coupling paths is large in the power unit PU may decrease. In other words, an area of the region A2 including the modules MJ in which the number of the coupling paths is small may increase. As a result, the vias 21 arranged in the adjacent power units PU may be arranged in the original power unit PU. As described above, the IR drop value does not exceed the target IR drop value due to optimizing the arrangement positions of the vias 21 with the designing unit 30 in FIG. 6.

For example, the designing unit 30 in FIG. 6 may optimize the shapes of the vias 21. That is, the designing unit 30 in FIG. 6 may increase the cross-sectional area of the vias 21. The vias 21 are arranged in a region including the modules in which the number of the coupling paths is small, e.g., the modules having an enough area for the channels for the signal lines. Thus, the signal lines are less likely to affect the channels, e.g., to cause a loss of channels, even when the cross-sectional area of the vias 21 is enlarged. As described above, the IR drop value does not exceed the target IR drop value due to optimizing the shapes of the vias 21 with the designing unit 30 in FIG. 6.

According to an aspect of the embodiment, advantages as described below may be attained.

(1) In Operation 41, the designing unit 30 in FIG. 6 sets the power unit PU in the core region 15 of the semiconductor device 10 in FIG. 1 and computes the value of the current consumption of the power unit PU based on the current consumption of the cells SC included in the power unit PU. The designing unit 30 in FIG. 6 computes a first power supply voltage drop from the source of the power supply voltage VDD to the node NO (one of the nodes N1 to N5) corresponding to the power unit PU of the first power supply line 16 based on the current consumption value and the resistance value of the resistance model R1 of the first power supply line 16. The designing unit 30 in FIG. 6 computes the contact resistance value corresponding to the node NOc based on the current consumption value, the first power supply voltage drop, and the target IR drop set for the node NOc corresponding to the power unit PU of the second power supply line 18 on the second wiring layer, which is different from the first wiring layer, and the number of the vias in the power unit PU based on the result of the comparison between the resistance value of the via 21 for coupling the first power supply lines 16 and the second power supply lines 18, and the contact resistance value. The power supply lines may be formed as estimated by arranging the desired number of the vias 21 in the power unit PU. In other words, repeated operations may be reduced by designing the power supply lines and signal lines so that the IR drop value does not exceed the target IR drop value.

(2) The semiconductor device 10 in FIG. 1 includes the power supply lines 16 and 17 that are formed in the highest layer and the power supply lines 18 and 19 that extend along the direction perpendicular to the power supply lines 16 and are formed in a wiring layer which is different, e.g., the fourth layer, from the wiring layer in which the power supply lines 16 and 17 are formed. The power supply lines 16 and 18 are electrically coupled through the vias 21, and the power supply lines 17 and 19 are electrically coupled through the vias 22. The power supply voltage VDD is coupled through the power supply lines 16, the vias 21, the power supply lines 18, and the vias 25 to the power supply lines 23 of the cells SC. The number of the vias 21 is set depending on the result of the comparison between the resistance value of the via 21 and the contact resistance value. The contact resistance value is a resistance value between two wiring groups coupled through the vias 21 in a given unit area and is computed based on the power supply voltage drop from the power supply line 16, the current consumption value of the unit area, and the allowable power supply voltage drop in the unit area. As described above, the desired amount of the IR drop may be obtained by setting the number of the vias 21 depending on the contact resistance value.

(3) The number of the vias 21 that is set depending on the result of the comparison between the contact resistance value and the resistance value of the via 21 is smaller than the number of the vias 21 that are used when the vias 21 are formed at all of the intersection points of the power supply lines 16 and 18. Therefore, the losses of the channels caused by the vias 21 may be reduced. In other words, the space for channels for forming the signal lines may be ensured to improve the wiring efficiency.

(4) The cross-sections of the power supply lines 16 and 17 that are formed in the highest layer and extend along the wiring layer have rectangular and band-like shapes when seen in a plane view. The widths of the power supply lines 16 and 17 are set so that the current desired for all of the cells SC included in the core region 15 may be supplied through the power supply lines 16 and 17 in the highest layer. As a result, the wiring layers formed lower than the wiring layer of the power supply lines 16 and 17 may be used as the region for the signal lines to increase the region for the signal lines. As a result, the wiring efficiency may be improved.

(5) The designing unit 30 in FIG. 6 estimates the wiring paths of the signal lines in each of the power units PU, cancels the arrangement of the vias 21 provisionally arranged in a region with a relatively large number of the signal lines, and evenly arranges the vias 21, where the number X of the vias 21 is set for each of the power units PU, in the region with a relatively small number of the signal lines, e.g., in the region A2 including the modules MJ in which the number of the coupling paths is smaller than the threshold. Thereby, the vias 21 included in the region with a relatively large number of the signal lines may be reduced to ensure the space for the channels for the signal lines. The designing unit 30 in FIG. 6 arranges the desired number of the vias 21 for the power unit PU in the power unit PU to form the power supply lines as estimated. That is, the power supply lines and signal lines are designed so that the IR drop value does not exceed the target IR drop value.

The embodiment may be modified as follows.

In the embodiment described above, the numbers of the vias 21 and 22 are set depending on the result of the comparison between the resistance values of the vias 21 and 22 and the contact resistance value. However, the shapes of the vias 21 and 22 may be changed. The numbers of the vias 21 and 22 may be reduced by changing the cross-sectional areas of the vias 21 and 22, e.g., the cross-sectional areas of the layers parallel to the substrate 11, to ensure the space for channels for forming the signal lines.

In the embodiment described above, the power supply lines 16 and 17 are formed in the highest layer. However, the basic power supply lines may be formed in two or more wiring layers. Also in such a case, the space for the channels for the signal lines may be ensured and the power supply structure of the semiconductor device may be designed to satisfy the desired IR drop by setting the numbers of the vias 21 and 22 as described above.

In the embodiment described above, even when the number of the vias is reduced to increase the region for the channels for the signal lines, the desired power supply voltage may be obtained in a given cell and reconsideration of the arrangement of the power supply lines caused when the desired power supply voltage is not obtained in the given cell may be prevented. That is, repeated operations may be reduced to shorten the time for the designing.

According to an aspect of the above-described embodiment, the space for the channels for the signal lines may be ensured and repeated operations may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method for designing a semiconductor device comprising:
   setting a given region in a core region of the semiconductor device;
   computing a current consumption value of the given region based on a current consumption value of a cell included in the given region;
   computing an amount of a first power supply voltage drop from a power source for supplying the cell with a power supply voltage to a first position corresponding to the given region of a first power supply line based on the current consumption value and a resistance value of the first power supply line included in a first wiring layer of the semiconductor device;
   computing a contact resistance value corresponding to a second position based on the current consumption value, the first power supply voltage drop, and an allowable power supply voltage drop set for the second position corresponding to the given region of a second power supply line included in a second wiring layer different from the first wiring layer, the allowable power supply voltage drop being set based on a voltage of the power supply source; and
   computing, by using a computer, a number of vias for the given region based on a result of a comparison between a resistance value of a via coupling the first power supply line and the second power supply line, and the contact resistance value.

2. The method for designing the semiconductor device according to claim 1, further comprising:
   generating a combined resistance model corresponding to an arrangement of the power supply lines in the given region; and
   setting the first position and the second position for two nodes of the combined resistance model.

3. The method for designing the semiconductor device according to claim 2, the combined resistance model comprising:
   a first resistance model corresponding to the first power supply line and including a plurality of resistances coupled in series;
   a second resistance model corresponding to the second power supply line and including a plurality of resistances coupled in series;
   a contact resistance coupled to an intersection point of the first resistance model and the second resistance model; and
   a current source coupled to a coupling point of the second resistance model and having a current value substantially equal to the current consumption value of the given region,
   wherein a coupling point of the first resistance model and the contact resistance is the first position and the coupling point of the second resistance model and the contact resistance is the second position.

4. The method for designing the semiconductor device according to claim 3,
   wherein the first power supply lines include a plurality of power supply lines extending along a first direction,
   wherein the second power supply lines include a plurality of second power supply lines extending along a second direction perpendicular to the first power supply lines,
   wherein the resistance model of the first power supply lines is a combined resistance model of the first power supply lines included in the given region, and
   wherein the resistance model of the second power supply lines is a combined resistance model of the second power supply lines included in the given region.

5. The method for designing the semiconductor device according to claim 1,
   wherein the first wiring layer is a highest layer of a plurality of wiring layers provided in the semiconductor device, and
   wherein the power supply lines included in the first power supply lines are shaped so as to supply the core region with a current.

6. The method for designing the semiconductor device according to claim 1, further comprising:
   estimating wiring paths of signal lines to be coupled to the cells; and
   determining at least either arrangement positions or shapes of the vias depending on a result of the estimation.

7. The method for designing the semiconductor device according to claim 6, further comprising, in the estimation of the wiring paths:
   dividing the given region into a plurality of modules;
   extracting coupling paths between the modules;
   extracting modules with a high number of the coupling paths passing therethrough based on the extracted coupling paths;
   identifying a region formed by the modules with the high number of the coupling paths passing therethrough as a non-arrangement region of the vias; and
   arranging the computed number of the vias in a region other than the non-arrangement region of the vias.

8. The method for designing the semiconductor device according to claim 7, further comprising arranging the computed number of the vias evenly in a region including the region other than the non-arrangement region of the vias and a region that is included in the region adjacent to the given region and has a small number of the signal lines when the number of the extracted modules with a high number of coupling paths passing therethrough is a given number or more.

9. A non transitory computer readable storage medium including a program that instructs the computer to execute:
   setting a given region in a core region of a semiconductor device;
   computing a current consumption value of the given region based on a current consumption value of a cell included in the given region;
   computing an amount of a first power supply voltage drop from a power source for supplying the cell with a power supply voltage to a first position corresponding to the given region of a first power supply line based on the current consumption value and a resistance value of the first power supply line included in a first wiring layer of the semiconductor device;
   computing a contact resistance value corresponding to the second position based on the current consumption value, the first power supply voltage drop, and an allowable power supply voltage drop set for a second position corresponding to the given region of a second power supply line included in a second wiring layer different from the first wiring layer, the allowable power supply voltage drop being set based on a voltage of the power supply source; and computing a number of vias in the given region based on a result of a comparison between a resistance value of a via coupling the first power supply line and the second power supply line and the contact resistance value.

10. The non transitory computer readable storage according to claim 9, wherein a combined resistance model corresponding to an arrangement of power supply lines in the given region is generated, and wherein a first position and a second position are set with respect to two nodes of the combined resistance model.

11. The non transitory computer readable storage according to claim 10, the combined resistance model comprising:
a first resistance model corresponding to the first power supply line and including a plurality of resistances coupled in series;
a second resistance model corresponding to the second power supply line and including a plurality of resistances coupled in series;
a contact resistance coupled to an intersection point of the first resistance model and the second resistance model; and
a current source coupled to a coupling point of the second resistance model and the contact resistance and set to have a current consumption value for the given region,
wherein a coupling point of the first resistance model and the contact resistance is the first position, and the coupling point of the second resistance model and the contact resistance is the second position.

12. The non transitory computer readable storage according to claim 9, wherein the first wiring layer is a highest layer of a plurality of wiring layers provided in the semiconductor device, and wherein a plurality of power supply lines included in the first power supply lines are shaped so as to supply the core region with a current.

13. The non transitory computer readable storage according to claim 12, in an operation for estimating wiring paths,
wherein the given region is divided into a plurality of modules,
wherein coupling paths between the modules are extracted,
wherein the modules in which the number of the coupling paths passing therethrough is high are extracted based on the extracted coupling paths,
wherein a region formed by the extracted modules in which the number of the coupling paths passing therethrough is high is identified as a non-arrangement region of vias, and
wherein the vias are arranged in a region other than the non-arrangement region.

14. The non transitory computer readable storage according to claim 13, wherein the computed number of the vias are arranged evenly in a region including the region other than the non-arrangement region and a region included in the region that is adjacent to the given region and has a small number of signal lines when a number of the extracted modules in which the number of the coupling paths passing therethrough is high is a given number or more.

15. A semiconductor device comprising:
a first power supply line included in a first wiring layer;
a second power supply line included in a second wiring layer different from the first wiring layer; and
a plurality of vias for electrically coupling the first power supply line and the second power supply line,
wherein the number of the vias is computed by:
setting a given region in a core region of the semiconductor device;
computing a current consumption value of the given region based on a current consumption value of a cell included in the given region;
computing a first power supply voltage drop from a power supply line for supplying the cell with a power supply voltage to a first position corresponding to the given region of the first power supply line based on the current consumption value and a resistance value of a first power supply line included in a first wiring layer of the semiconductor device;
computing a contact resistance value corresponding to a second position based on the current consumption value, the first power supply voltage drop, and an allowable power supply voltage drop set at a second position corresponding to the given region of a second power supply line included in a second wiring layer different from the first wiring layer, the allowable power supply voltage drop being set based on a voltage of the power supply source; and
computing a number of vias for the given region based on a result of a comparison between a resistance value of a via for coupling the first power supply line and the second power supply line and the contact resistance value.

16. The semiconductor device according to claim 15,
wherein the first wiring layer is a highest layer of a plurality of wiring layers provided in the semiconductor device, and
wherein a plurality of power supply lines included in the first power supply lines are shaped so as to allow a current for the core region to be supplied.

17. The semiconductor device according to claim 15, wherein the computed number of the vias are arranged evenly in a region having a small number of signal lines and included in the given region.

* * * * *